United States Patent [19]
Puri et al.

[11] Patent Number: 6,134,269
[45] Date of Patent: Oct. 17, 2000

[54] FIXED OR ADAPTIVE DEINTERLEAVED TRANSFORM CODING FOR IMAGE CODING AND INTRA CODING OF VIDEO

[75] Inventors: Atul Puri, Riverdale, N.Y.; Robert Louis Schmidt, Howell, N.J.; John Wus, Warminster, Pa.

[73] Assignee: AT&T Corp, New York, N.Y.

[21] Appl. No.: 08/813,218

[22] Filed: Mar. 7, 1997

Related U.S. Application Data

[60] Provisional application No. 60/027,436, Sep. 25, 1996.

[51] Int. Cl.[7] ................................................. H04N 7/30

[52] U.S. Cl. .......................... 375/240; 348/405; 348/408; 348/418

[58] Field of Search ..................................... 348/405, 418, 348/408; 382/253, 248, 243; 375/240

[56] References Cited

U.S. PATENT DOCUMENTS

| | | |
|---|---|---|
| 4,958,226 | 9/1990 | Haskell et al. . |
| 4,999,705 | 3/1991 | Puri . |
| 5,134,476 | 7/1992 | Aravind et al. . |
| 5,189,526 | 2/1993 | Sasson ................................. 358/432 |
| 5,214,507 | 5/1993 | Aravind et al. . |
| 5,227,878 | 7/1993 | Puri et al. . |
| 5,253,055 | 10/1993 | Civanlar et al. . |
| 5,253,056 | 10/1993 | Puri et al. . |
| 5,270,813 | 12/1993 | Puri et al. . |
| 5,278,646 | 1/1994 | Civanlar . |
| 5,436,985 | 7/1995 | Li ......................................... 382/253 |
| 5,500,678 | 3/1996 | Puri ...................................... 348/408 |
| 5,592,569 | 1/1997 | Li ......................................... 382/253 |
| 5,883,981 | 3/1999 | Li ......................................... 382/253 |
| 5,929,912 | 7/1999 | Aono .................................... 348/405 |

FOREIGN PATENT DOCUMENTS

WO94/27252  11/1994  WIPO .

OTHER PUBLICATIONS

U.S. application No. 60/026,962, Li et al., filed Sep. 20, 1996.

U.S. application No. 08/733,849, Li et al., filed Oct. 18, 1996.

U.S. application No. 60/020,776, Li et al., filed Jun. 28, 1996.

Author: Ad hoc group on MPEG–4 video VM editing, "MPEG–4 Video Verification Model Version 3.2", International Organisation for Standardisation, ISO/IEC JTC1/SC29/WG11, Coding of Moving Pictures and Associated Audio Information, Chicago, Sep., 1996.

Kim J. W. et al.: "A Transform Domain Classified Vector Quantizer for Image Coding", IEEE Transactions on Circuit and Systems for Video Technology, Mar. 1992 (Mar. 1992), pp. 3–14, XP002115624.

Kok C. W. et al.: "Image Coding Using DCT of Wavelet Coefficients", Proceedings of the IEEE–SP International Symposium Time–Frequency and Time–Scale Analysis (CT. No. 92TH0478–8), Victoria, BC, Canada, Oct. 4–6, 1992, pp. 475–478, XP002115625 1992, NY, NY, IEEE, USA ISBN: 0–7803–0805.

(List continued on next page.)

*Primary Examiner*—Howard Britton

[57] ABSTRACT

A coding strategy efficiently codes intra (macroblocks, regions, pictures, VOP) data. This strategy uses two basis approaches, a Fixed Deinterleaved Transform Coding approach, and an Adaptive Deinterleaved Transform Coding approach. Furthermore, within each approach, two types of coders are developed. One coder operates on an entire picture or VOPs and the other coder operates on small local regions. Using coders and decoders of the present invention, efficient coding at a range of complexities becomes possible, allowing suitable tradeoffs for a variety of applications.

31 Claims, 8 Drawing Sheets

OTHER PUBLICATIONS

Bellifemine F.: "Combining DCT and Subband Coding Into An Intraframe Coder", Signal Processing, Image Communication, vol. 5, no.3, May 1, 1993 (May 01, 1993), pp. 235–248, XP000367171, ISSN: 0923–5965.

Ploysongsang A. et al.: "DCT/DPCM Processing of NTSC Composite Video Signal", IEEE Transactions On Communications, vol. COM–30, no. 3, Mar. 1, 1982 (Mar. 01, 1982), pp. 541–549, XP002062314, ISSN: 0090–6778.

De Natale F. G. B. et al.: "Adaptive DCT For Image–Data Compression", European Transactions on Telecommunications and Related Technologies, vol. 3, no. 4, Jul. 1, 1992 (Jul. 01, 1992), pp. 359–366, XP000310681, ISSN: 1120–3862.

Park H. J. et al.: "DWT and CVQ Based Image Coding For a Low Bit Rate", Electronic Letters, vol. 31, no. 10, May 11, 1995 (May 11, 1995), pp. 781–782, XP000518283, ISSN: 0013–5194.

FIXED OR ADAPTIVE DEINTERLEAVED TRANSFORM CODING FOR IMAGE CODING AND INTRA CODING OF VIDEO

This patent applicaiton is based on provisional application Ser. No. 60/027,436 filed on Sep. 25, 1996.

BACKGROUND OF THE INVENTION

The present invention relates generally to methods and apparatuses for coding images and intra coding of video and more particularly to a method and apparatus for coding images and intra coding of video using transform coding. Intra coding is important for applications requiring simple encoding/decoding, low delay, a high degree of error robustness or a high level of interactivity. Examples of such applications include image/video on the Internet, wireless video, networked video games, etc.

The state of the art standards in image coding and intra coding of video employ transform coding (e.g., Discrete Cosine Transformation, DCT), which involves partitioning an image into non-overlapping blocks of 8×8 size and coding in units of a 2×2 array of luminance (Y) blocks and a corresponding chrominance block of Cr and a block of Cb signal (together referred to as a macroblock). Improvements in performance of intra coding have been obtained by predicting the DC coefficient of DCT blocks by using previously reconstructed DC coefficients. Recently, further improvements have been obtained in MPEG-4 by predicting AC coefficients as well.

Over the past several years, many researchers have followed a different approach that uses wavelets instead of transform coding. These researchers have reported substantial improvements, at the expense of increased complexity. Recently, variations of wavelet coding that use subsampling prior to coding have emerged (some of which are currently being experimented with in MPEG-4), that provide an even higher performance by using advanced quantization techniques that take advantage of subsampling, however, the complexity of such schemes is extremely high.

The present invention is therefore directed to the problem of developing a method and apparatus for coding images and video that has a high coding efficiency yet relatively low coding complexity.

SUMMARY OF THE INVENTION

The present invention solves this problem by using a deinterleaving step prior to the transformation step in combination with a suitable quantization technique. Deinterleaving is a more flexible form of subsampling. The method and apparatus of the present invention thus achieve the coding efficiency of wavelet coding, at the expense of only a small improvement in complexity over traditional transform coding but at a significantly reduced complexity relative to wavelet coding.

The present invention includes two forms of deinterleaving in the encoding process. According to the present invention, improved intra coding is achieved by fixed or adaptive deinterleaving, transform (e.g., DCT), quantization with extensions and entropy encoding. (e.g., Variable Length Encoding, VLE, or Arithmetic Encoding, AE). According to the present invention, there are two main approaches to coding. The first uses fixed deinterleaving, and the second uses adaptive deinterleaving. It now becomes possible as a result of the present invention to use a simple transform coding method that achieves high coding efficiency using a fixed deinterleaving approach, or to use a slightly more complex method that produces somewhat better results based on an adaptive deinterleaving approach, and yet both of these approaches are less complex than wavelet coding and achieving the same or nearly the same coding efficiency.

According to advantageous implementations of the present invention, for each approach, two variations exist, one intended for separate motion/texture part of the MPEG-4 Verification Model (VM) (global transform) coding and the other intended for combined motion/texture part of the VM (local transform) coding.

FIG. depicts an example of quantized DC coefficients prediction used in the present invention.

Figure 11:
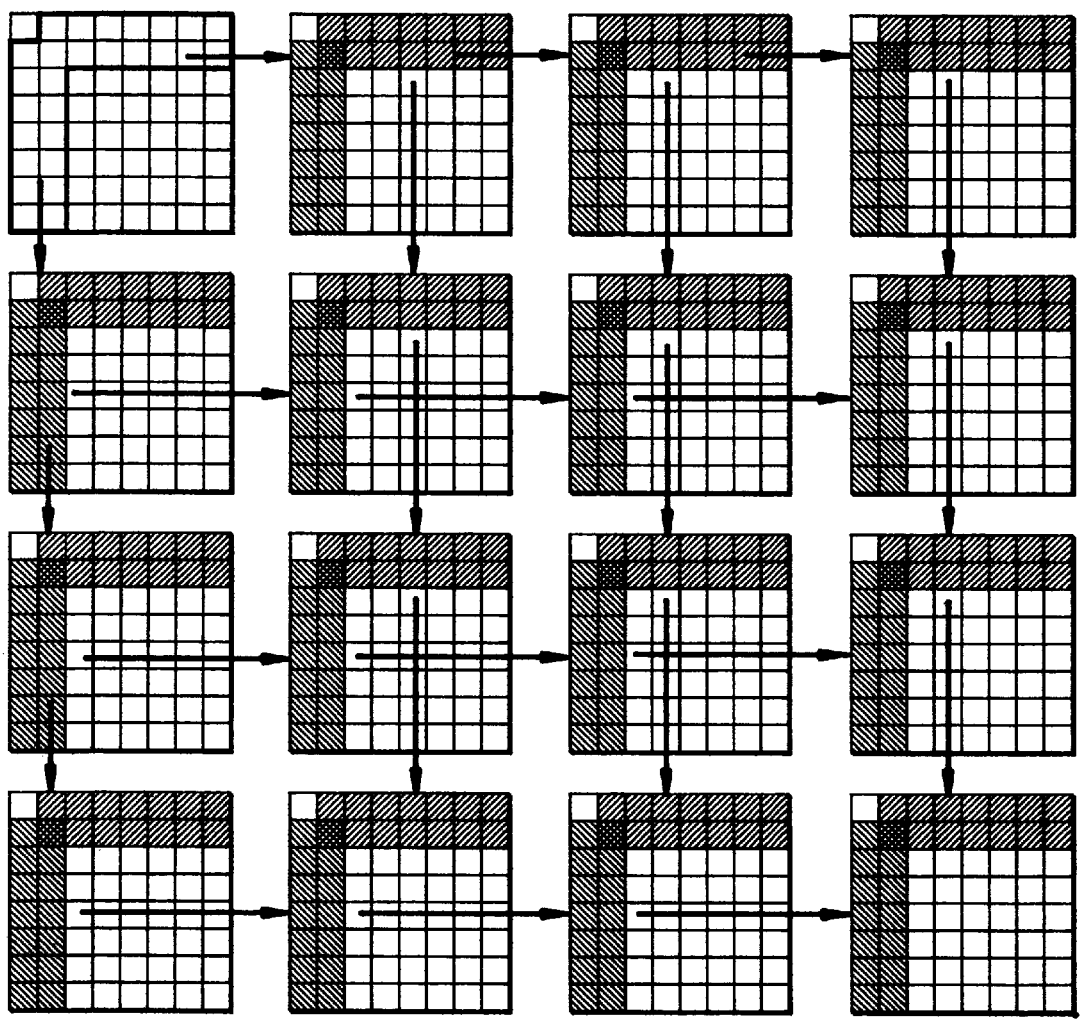

FIG. 11 shows an example of AC coefficient prediction structure employed in the present invention.

Figure 12:
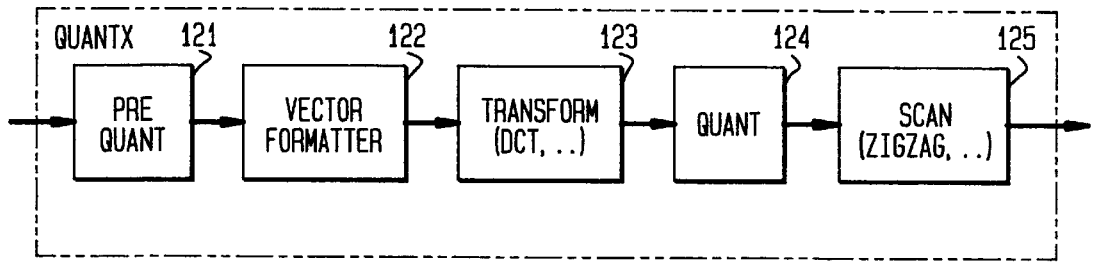

FIG. 12 depicts another method of extended quantization, QuantX Method 2, according to the present invention.

Figure 13:
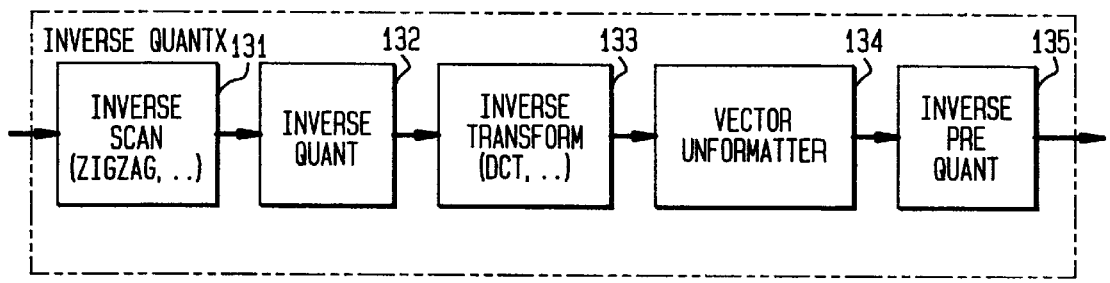

FIG. 13 shows the inverse operation of the extended quantization method shown in FIG. 12, QuantX Method 2, according to the present invention.

Figure 14:
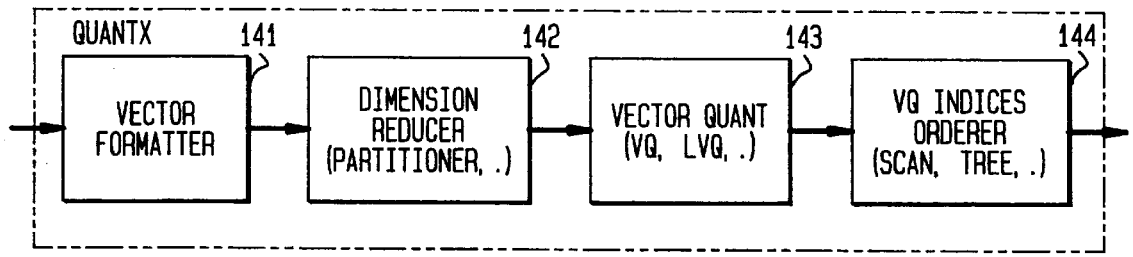

FIG. 14 depicts another method of extended quantization, QuantX Method 3, according to the present invention.

Figure 15:
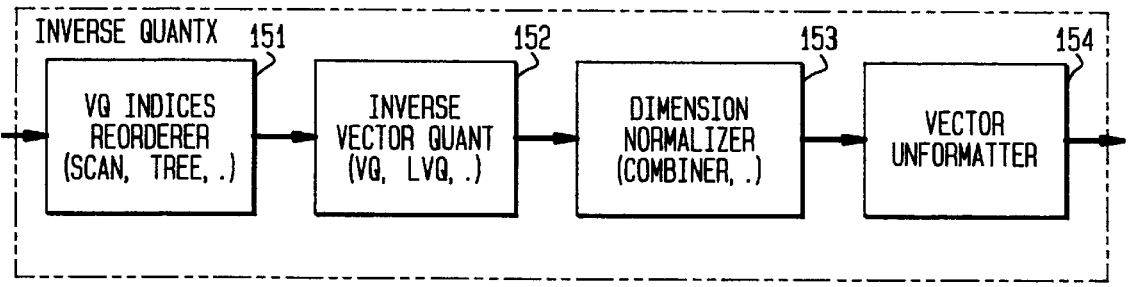

FIG. 15 shows the inverse operation of the extended quantization method shown in FIG. 14, QuantX Method 3, according to the present invention.

Figure 16:
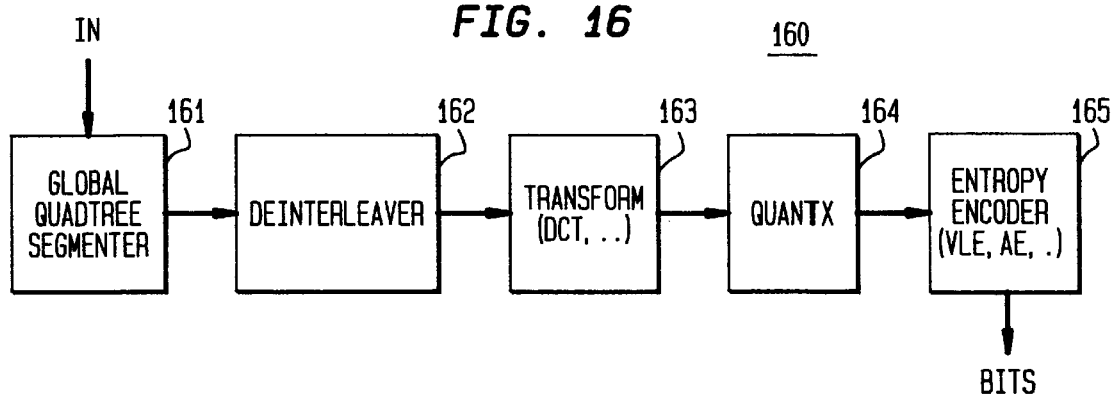

FIG. 16 shows the block diagram of an Adaptive Global Deinterleaved Transform (AGDT) encoder 150 used in the present invention.

Figure 17:
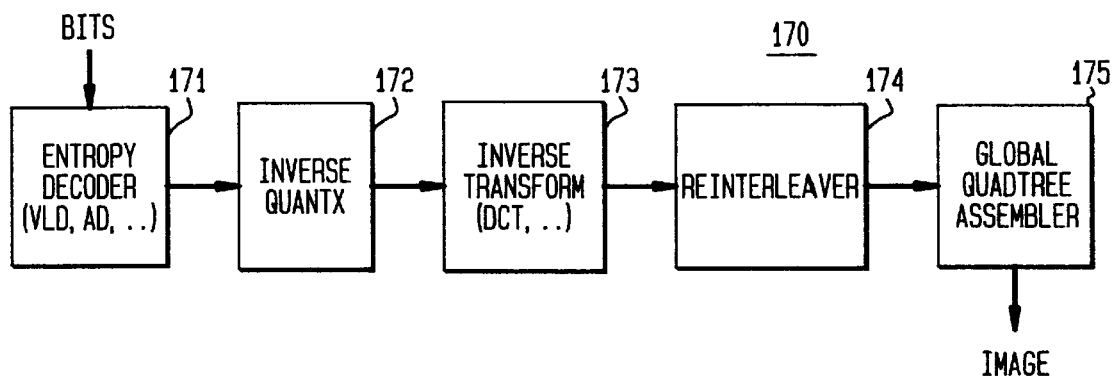

FIG. 17 shows the block diagram of the AGDT decoder used in the present invention, which corresponds to the AGDT encoder shown in FIG. 16.

Figure 18:
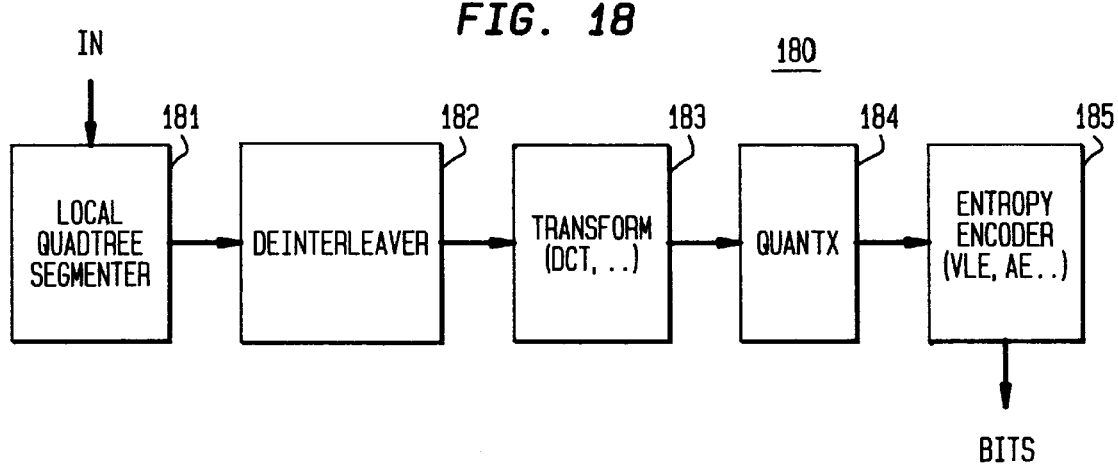

FIG. 18 shows a block diagram of an Adaptive Local Deinterleaved Transform (ALDT) encoder used in the present invention.

Figure 19:
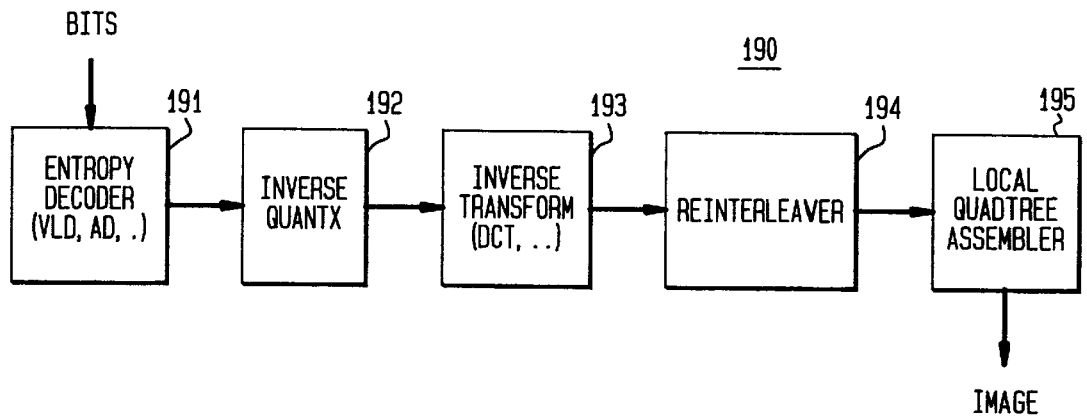

FIG. 19 shows the ALDT decoder used in the present invention, which corresponds to the encoder of FIG. 17.

Figure 20:
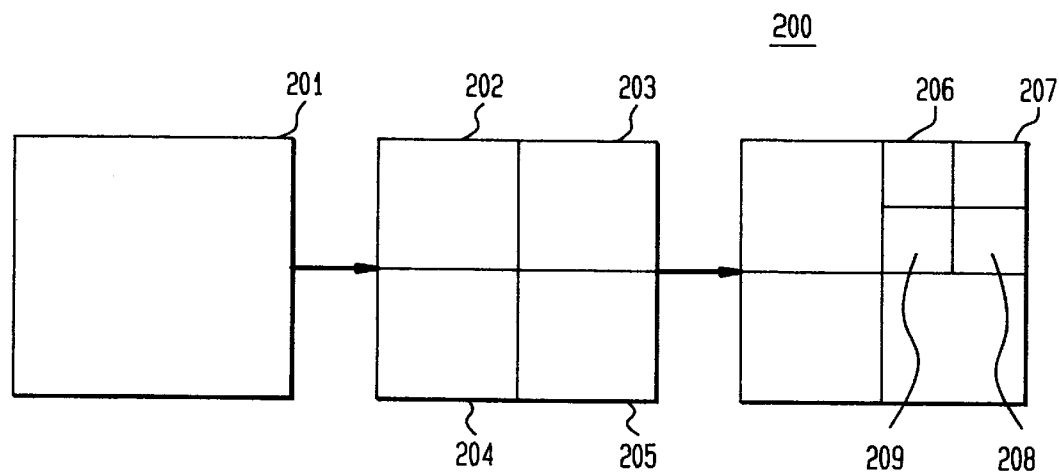

FIG. 20 shows an example of quadtree segmentation employed in the present invention.

DETAILED DESCRIPTION

According to the present invention, a significant improvement in efficiency of intra coding within the framework of transform coding is now possible. The present invention has been designed for use with MPEG-4. Often in MPEG-1/2 video coding, intra coding is employed for pictures coded by themselves, which are called I-pictures, or for intra macroblocks in predictively coded pictures (P-pictures or B-pictures). Besides pictures or macroblocks. MPEG-4 also introduces the concept of Video Objects (VO) and Video Object Planes (VOPs).

In MPEG-4 coding a scene can be partitioned into a number of Video Objects each of which can be coded independently. A VOP is a snapshot in time of a Video Object. In fact, a picture then becomes a special case of a VOP that is rectangular in shape.

MPEG-4 coding also includes coding of VOPs of different types, such as I-VOPs, P-VOPs, and B-VOPs, which are generalizations of I-pictures, P-pictures, and B-pictures, respectively. Thus, in addition to coding of I-pictures and intra macroblocks the present invention can also be used for coding of I-VOPs, both rectangular and arbitrary in shape.

The main functionality addressed by the present invention is a coding efficiency of I-VOPs, although this approach is extendable to coding of P-VOPs and B-VOPs. An additional functionality that could be indirectly derived from the present invention is spatial scalability.

The present invention achieves a significant improvement in intra coding efficiency (by a factor of 1.5 or more) and can be obtained while still employing the DCT coding framework by requiring the addition of deinterleaving and extended quantization. In general, intra coding efficiency can also be somewhat improved by further improving DC coefficient prediction, incorporating AC coefficient predictions and scanning adaptations, however, even after combining all these techniques the improvements may be relatively small as compared to the potential improvement of the present invention.

Figure 1:
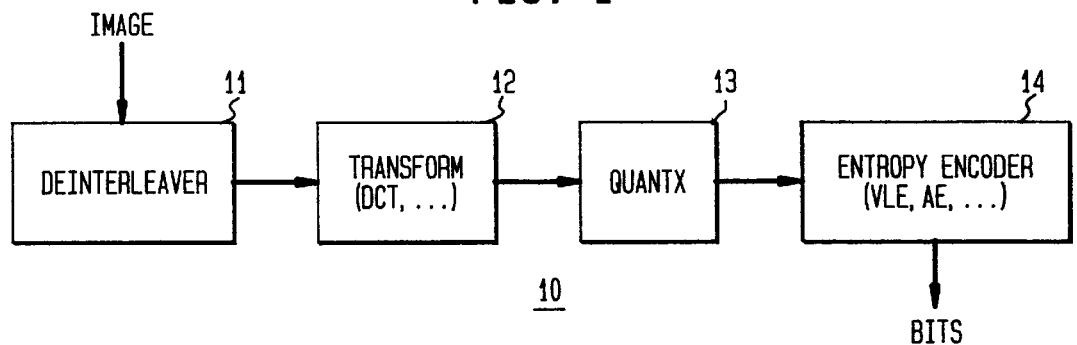
FIG. 1 depicts the basic encoder block diagram for Global Deinterleaved Transform (GDT) coding according to the present invention.

For I-VOPs coding in MPEG-4, FIG. 1 depicts the basic encoder 10 block diagram of Global Deinterleaved Transform (GDT) coding according to the present invention. At the input to the deinterleaver 11, the image is in pixel format with each pixel being represented by the three components of luminance, chrominance and saturation, which are digital values. These digital values are fed into the deinterleaver 11, which separates contiguous samples within the image. In other words, the deinterleaver 11 separates the pixels sets into a number of pixel subsets, but does so by creating subsets from non-contiguous pixels. This then requires specification of the separation pattern used. Each subset contains several of the digital samples, however, the samples within a given subset were not contiguous with each other in the original image.

The transform operation 12 converts the digital pixel values within each subset into transform coefficients, such that most of the energy is packed in a few coefficients. In this step, for example, Discrete Cosine Transform (DCT) can be used. Other known transform techniques can also be used.

The transformer 12 receives the pixel subsets from the deinterleaver 11. Each subset contains several pixels, with each pixel being represented by the three values of chrominance, luminance and saturation, or some equivalent color system. The transformer 12 then outputs coefficients representing the spatial frequency components of the values within each subset. While there is no real compression at this point, the DCT transform groups the data that enables the latter processes to significantly reduce the data. The DCT transform defines most of the information within the subset in the lower spatial frequencies and many of the higher spatial frequencies come out to be zero, resulting in compression later on. The output of the transformer 12 then is a block of coefficients, one block for each subset created by the deinterleaving process 11.

The QuantX process 13 includes normal quantization plus some extensions to improve coding efficiency and prepares the data for entropy encoding 14. This will be described in detail below, as three different QuantX processes 13 are presented herein. The output of the QuantX process 13 is a block of bits, one for each subset created in the deinterleaving process 11.

Following the QuantX process 13 is the encoding process 14. In this case entropy encoding is used. Any form of entropy encoding will suffice. Variable Length Encoding (VLE) is one example of entropy encoding. Arithmetic Encoding (AE) is another example. The coded bitstream generated by the Entropy Encoder 14 can now be stored or transmitted.

Other known entropy encoding can be used.

Figure 2:
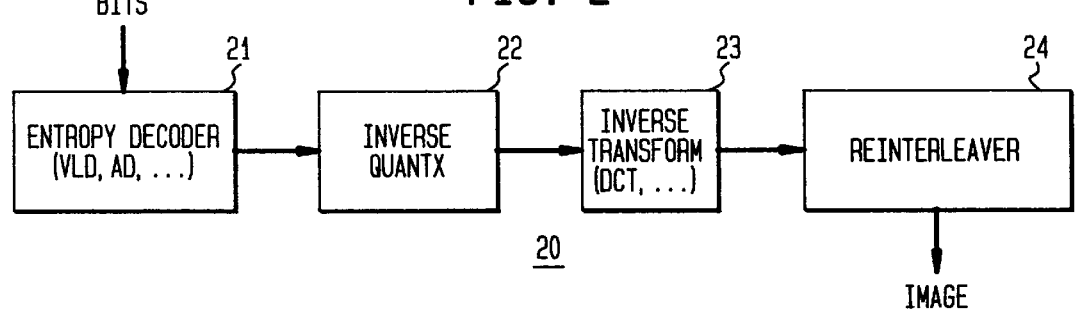
FIG. 2 shows the corresponding decoder for the encoder shown in FIG. 1 according to the present invention.

FIG. 2 shows the decoder 20 corresponding to the encoder 10 shown in FIG. 1. The decoder 10 for Global Deinterleaved DCT Encoding of I-VOPs includes an entropy decoder 21, an inverse quantization 22, an inverse transform 23 and a reinterleaver 24. The entropy decoder 21 inverts codewords back to coefficient data. The inverse quantization 22 performs the inverse operation of the quantization 13 plus some extensions performed in the encoder 10. The inverse transform 23 performs the inverse operation of the transform 12, and the reinterleaver 24 performs the inverse of the deinterleaver 11.

The coded bitstream is fed into the entropy decoder 21. The entropy decoder 21 outputs a block of data similar to that input to the entropy encoder 14. Due to the deinterleaving 11 performed on the coding side, this block of data is subgrouped into blocks corresponding to the subsets created by the deinterleaver 11. The entropy decoder 21 outputs the block of data to the Inverse QuantX 22.

The Inverse QuantX 22 will be described in detail below, as three different processes are presented herein, depending upon the coding process performed. The Inverse QuantX 22 feeds its output to the inverse transform 23. The output of the Inverse QuantX 22 is a block of coefficients, which can be further subgrouped according to the subsets created by the deinterleaving process 11.

The inverse transform 23 then performs the inverse transform operation on each subblock of coefficients to convert it to a subblock of pixel subsets. These subblocks are now ready for reinterleaving. The reinterleaver 24 then reconstructs the original order in which the pixels appeared.

Figure 3:
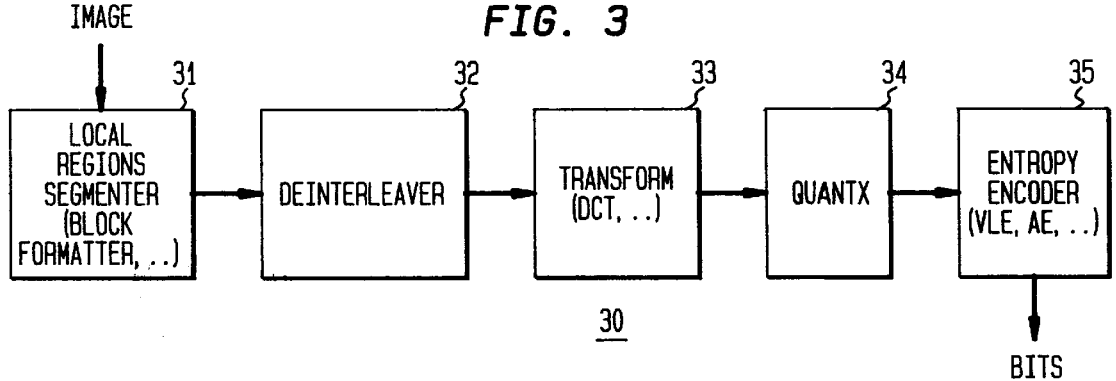
FIG. 3 depicts the basic encoder block diagram of Local Deinterleaved Transform (LDT) coding according to the present invention.

FIG. 3 depicts the basic encoder 30 block diagram of LDT coding. The main difference with respect to FIG. 1 is that prior to deinterleaving an input VOP or picture is segmented into local regions. These regions can be either square (blocks) or even arbitrary in shape. With such segmentation, some of the coding details related to transform size and QuantX may change.

The image in pixel format is fed into the local regions segmenter 31, which outputs the segmented image signal to the deinterleaver 32. In this case, the local regions segmenter 31 creates subsets of pixels, which are contiguous. Then, in the deinterleaving step 32, these subsets are further partitioned so that the resulting partitioned subsets each contain non-contiguous pixels.

As in FIG. 1, the remaining process is the same. The deinterleaver 32 passes its output to the transformer 33, which in turn feeds the QuantX 34, which feeds the entropy encoder 35, which outputs the coded bitstream.

Figure 4:
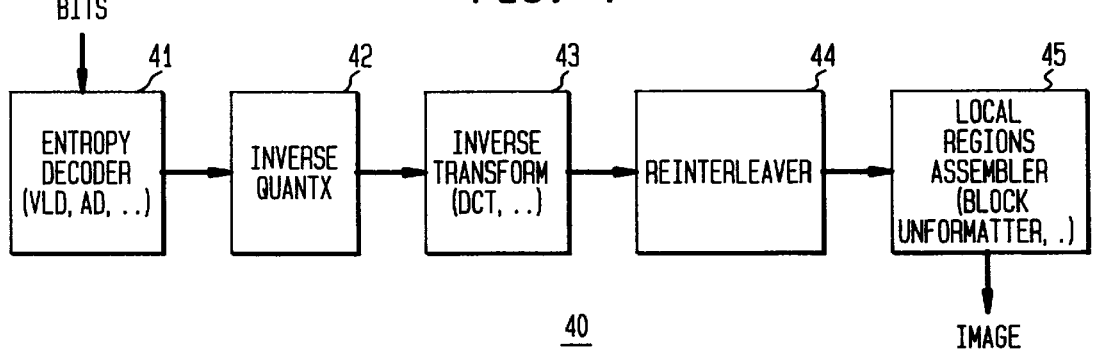
FIG. 4 shows the corresponding decoder for the encoder shown in FIG. 3 according to the present invention.

FIG. 4 shows the corresponding decoder 40 for the encoder 30 shown in FIG. 3. The main difference with respect to the GDT decoder shown in FIG. 2 is the addition of the local regions assembler 45 (e.g., block unformatter) at the end of the decoding process. The local regions assembler 45 performs the inverse operation of the local regions segmenter 31. The LDT decoder 40 includes the entropy decoder 41, the inverse quantization 42, the inverse transform 43 the reinterleaver 44, and the local regions assembler 45.

The process in FIG. 4 is identical to the process in FIG. 2, except that each step in the process is being performed on a partitioned subset relative to FIG. 2. For example, the encoded bits are fed into the entropy decoder 41. These bits are ordered by the local regions created in the encoding process 30. Thus, each step is performed on each local region group separately. The decoder 41 then outputs groups of blocks of bits to the QuantX 42, which then creates the groups of blocks of coefficients necessary for the inverse transform process 43. The inverse transform process 43 then outputs the groups of pixels to the reinterleaver 44, which reinterleaves the pixels within each group. Output from the reinterleaver 44 is therefore the local regions created by the local region segmenter. One can view the decoding process 40 in this case as being performed on each local region separately. At the end of this decoding process 40, the local regions are then assembled by the local regions assembler 45 to reconstruct the pixel image as it was presented to the local regions segmented 31.

We shall now describe some of the steps within the process in more detail. These include deinterleaving, and QuantX.

Deinterleaving

Deinterleaving is the process of separating an input picture (or a region) into subpictures (or subregions) such that the neighboring samples in the input picture (or region) are assigned to different subpictures (or subregions). The resulting subregions or subpictures thus contain samples that were not contiguous in the original picture.

Figure 5:
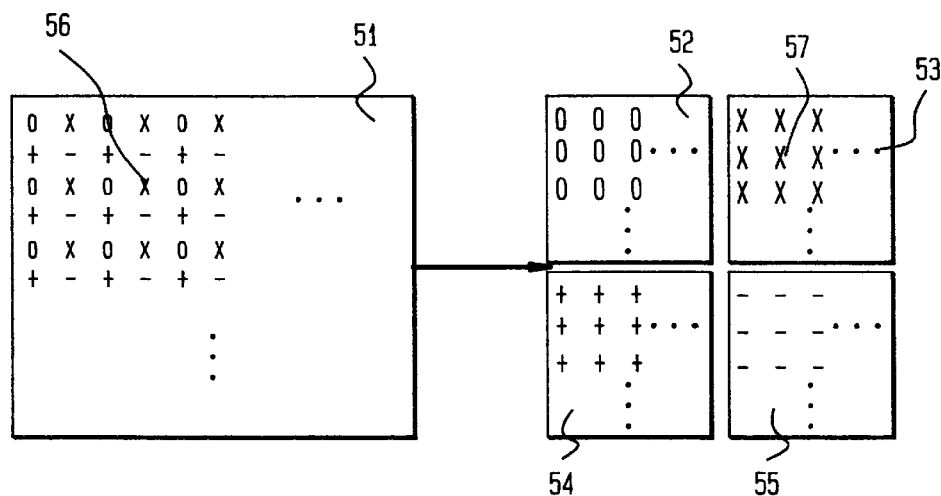
FIG. 5 shows a simple example of deinterleaving a region by a factor of 2 both in the horizontal and vertical direction to generate subregions.

FIG. 5 shows a simple example of deinterleaving a region by a factor of 2 both in the horizontal and vertical direction to generate subregions. The original picture 51 being composed of pixels (o, x, +, −) is deinterleaved into four subpictures 52–55. Every other element of the first row (o, x, o, x, o, x) is then assigned to the first row of subpicture 51 (o, o, o) and the first row of the second subpicture 52 (x, x, x). The same is true for the remaining odd rows. The even rows are assigned to the third and fourth subpictures (+, +, +) and (−, −, −), respectively, and split as before. Essentially, each pixel ($p_{ij}$) is assigned to the subpicture$_{k,m}$ where k=mod(i/n) and m=mod(j/n) and becomes element $p_{r,s}$ in that subpicture, where r=(i−k)/n and s=(j−m)/n.

For example, if we let where n=2, as in FIG. 5, we note that element 56 (i.e., $p_{23}$), is assigned to subpicture 01 (element 53), that is, k=mod(2/2)=0 and m=mod(3/2)=1. If we examine subpicture 01 (element 53), we note that element 57 appears as pixel 11 in that subpicture, and r=(i−k)/n=(2−0)/2=1 and s=(j−m)/n=(3−1)/2=1.

Figure 6:
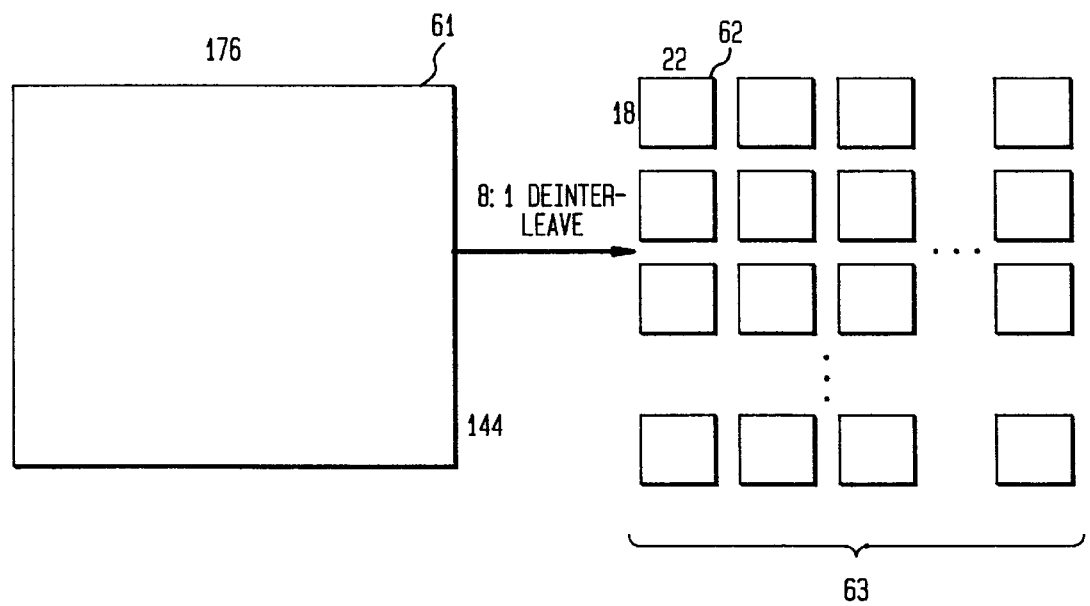
FIG. 6 shows an 8×8 array of subpictures, each 22×18 in size that results from application of 8:1 deinterleaving in horizontal and vertical directions to the luminance signal in GDT coding for QCIF resolution.

In this example, in GDT coding, the deinterleaving factor is fixed to 8:1 for QCIF input resolution (176×144). For this resolution, FIG. 6 shows an 8×8 array, 63, of subpictures, each subpicture 62 being 22×18 in size that results from application of 8:1 deinterleaving in horizontal and vertical directions to the luminance signal. Also, each of the chrominance components are deinterleaved by a factor of 4:1 resulting in a 4×4 array of subpictures, each of size 22×18.

Figure 7:
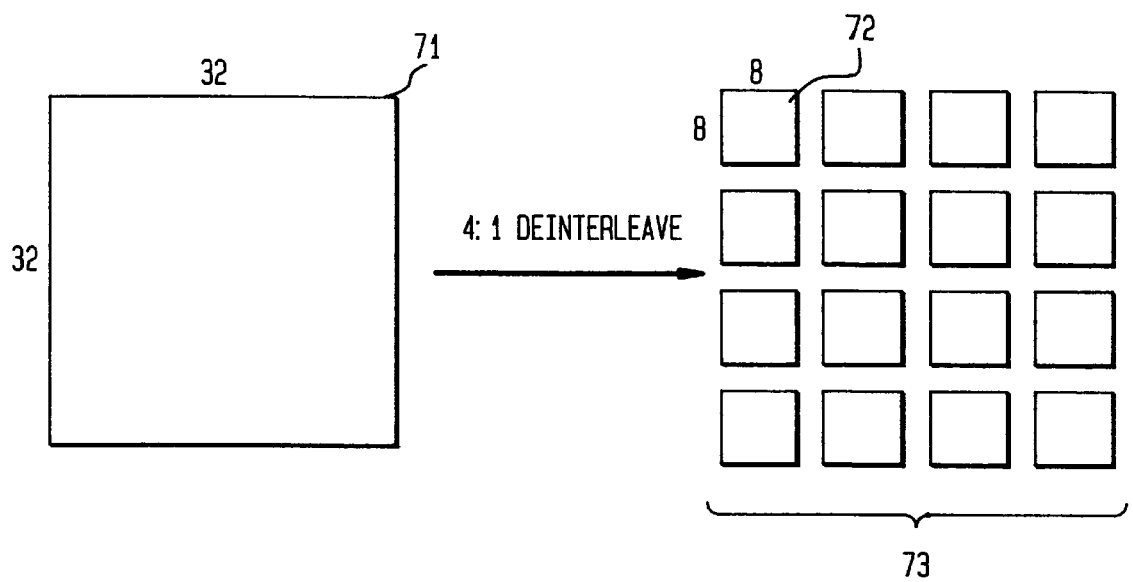
FIG. 7 shows a 4×4 array of subpictures each 8×8 in size that result from application of 4:1 deinterleaving in horizontal and vertical directions to 32×32 regions of luminance signal in LDT coding for QCIF resolution.

On the other hand, in LDT coding, the deinterleaving factor is fixed to 4:1 for QCIF input resolution. FIG. 7 shows a 4×4 array, 73, of subpictures each subpicture 72 being 8×8 in size that results from application of 4:1 deinterleaving in horizontal and vertical directions to 32×32 regions of luminance signal. In this case, the chrominance components are deinterleaved by a factor of 2:1 resulting in a 2×2 array of subregions, each 8×8 in size.

DCT

Two dimensional DCT is applied to deinterleaved subpictures or subregions. In GDT coding at QCIF resolution, the size of DCT is chosen to be 22×18 both for the luminance as well as the chrominance components. In LDT coding at QCIF resolution, the size of DCT is chosen to be 8×8 both for the luminance as well as the chrominance components.

QuantX Choices

The normal scalar quantization needs to be modified to take into account the fact that the transform coding is performed on deinterleaved data. Beyond quantization, the coefficient prediction of experiment may also be more effective in increasing coding efficiency due to higher correlation between coefficients of deinterleaved adjacent subpictures (subregions). Another approach is to exploit this correlation by forming vectors of coefficients of the same spectral frequency and performing DCT coding on such vectors (blocks). Finally, yet another alternative is to use vector quantization or a specific variation called Lattice Vector Quantization (LVQ) being examined in MPEG-4. These various approaches are referred to here as QuantX and offer different tradeoffs in performance versus complexity and the right one may be selected based on the application.
QuantX Method 1: Quantization and DCT Coefficient Predictions This method is explained by reference to FIG. 8. The signal input to the QuantX 80 is received by a quantizer 81, whose output signal is split. One path feeds a DC & AC Coefficient Predictor 82, and another path feeds one input of a subtractor 83. The output of the DC & AC Coefficient Predictor 82 feeds the other input of the subtractor 83. The output of the DC & AC Coefficient Predictor 82 is subtracted from the output of the quantizer 81 and fed into a scanner 84, such as a zigzag scanner.

In GDT coding, the DCT coefficient subpictures of size 22×18 are quantized by the normal scalar quantization and then the coefficient subpictures are predicted based on previously quantized coefficient subpictures and coefficient difference subpictures are formed. In LDT coding, a very similar operation takes place on DCT coefficient subregions of size 8×8. The difference coefficients are scanned (e.g., zigzag scanned) to form (run, level) events.

Figure 8:
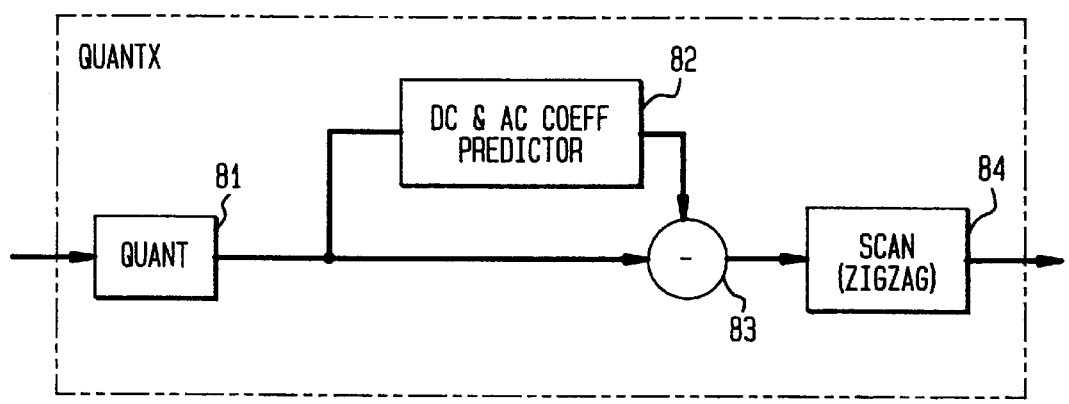
FIG. 8 depicts one method of extended quantization, QuantX Method 1, according to the present invention.
Figure 9:
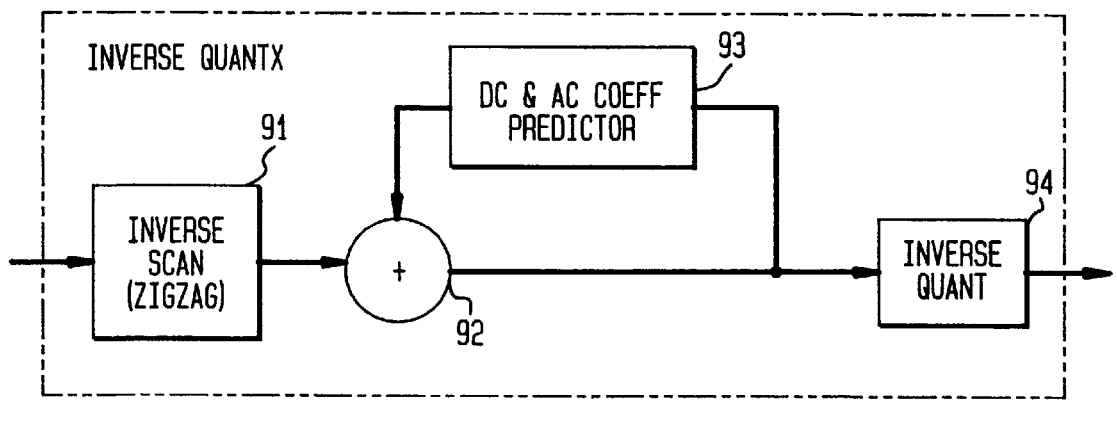
FIG. 9 shows the inverse operation of the extended quantization method shown in FIG. 8, QuantX Method 1, according to the present invention.

FIG. 9 shows the inverse operation of the QuantX shown in FIG. 8. The signal input to the Inverse QuantX 90 is received by the Inverse Scanner 91. The output of the inverse scanner 91 is fed to one input of an adder 92. The second input of the adder 92 is from the output of a DC &

AC Coefficient Predictor 93 which receives its input from the output of the adder 92. The output of the adder 92 is also passed to the inverse quantizer 94, which outputs the desired signal.

Figure 10:
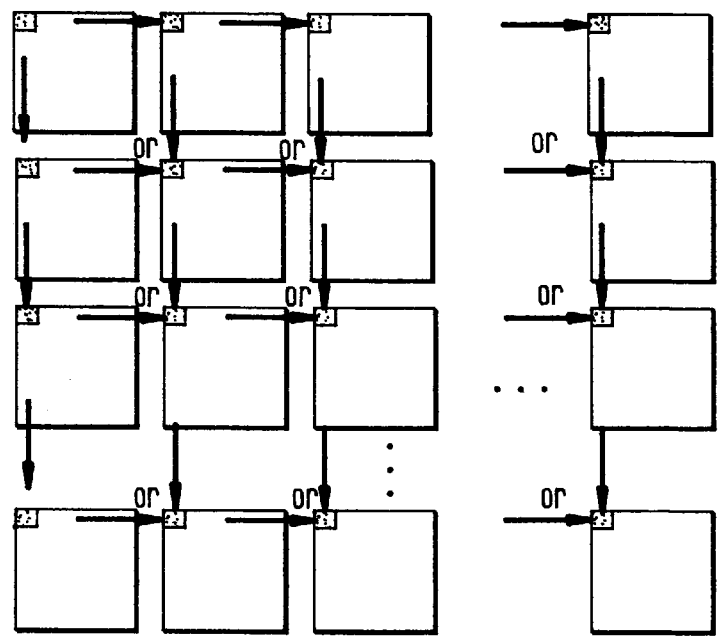

A scheme for quantized DC coefficients prediction is illustrated in FIG. 10. In GDT coding, the DC prediction of leftmost subregion (subpicture) is selected to 128 while in GDT coding, using 1 bit overhead, selection between DC values of horizontally or vertically adjacent subregions (subpictures) is made. For the remaining subregions (subpictures) in the first row, DC prediction uses previous subregion (subpicture) DC value. For the first subregion (subpicture) of the second row, DC prediction is taken from the subregion (subpicture) above; all the other subregions (subpictures) of that row use Graham's predictor adaptively by selecting from horizontal and vertical adjacent subregion (subpicture) DC values without overhead. The prediction process for the second row is repeated for subsequent rows.

We now discuss how AC coefficient predictions are made. FIG. 11 shows an example of AC coefficient prediction structure employed. In the case of LDT coding with 8×8 subregions, 2 rows and 2 columns of AC coefficient predictions for a subregion may be used. In case of larger subregion sizes in LDT coding or larger pictures in GDT coding, more AC coefficients may be predicted; the number and the structure of coefficients being predicted can be different but the basic principle of prediction remains the same.

For the left-most subregion (subpicture) of a region (picture), AC coefficient predictions are reset to 0. For the subsequent subregions (subpictures) in the first row of subregions, the L-shaped highlighted area (without DC coefficient) is predicted from subregions (subpicture). For the first subregion of second row of subregions, the same L-shaped area is predicted from the subregion immediately above. Subsequent subregions of second row are predicted by using first two columns of coefficients from previous subregion and the first two rows from the subregion above. There is an overlap of 1 coefficient (AC11), which is resolved by averaging the two prediction choices for this coefficient to generate a single prediction coefficient. The prediction process for the second row is repeated for subsequent rows.

Further, the potential of making the prediction process adaptive (with or without overhead) is also possible.

The difference coefficient subpictures of size 22×18 in GDT coding and subblocks of size 8×8 in LDT coding are zigzag scanned to form (run, level) events.

QuantX Method 2: Quantization and DCT of DCT Coefficient Vectors

FIG. 12 illustrates the operations employed in this method of QuantX. In GDT coding of QCIF pictures, the DCT coefficient subpictures of size 22×18 are prequantized by a small quantization level (Qp=2 or 3) to reduce their dynamic range and then vectors (of 8×8 size for luminance and 4×4 size for chrominance) are generated by collecting all coefficients of the same frequency through all of the subpictures, DCT and quantized. In LDT coding with regions of size 32×32, a very similar operation takes place resulting in coefficient vectors (of 4×4 size for luminance and 2×2 size for chrominance), these vectors are DCT and quantized. In GDT coding, quantized DCT coefficient vectors of 8×8 size for luminance and 4×4 size for chrominance are zigzag scanned to form (run, level) events. In LDT coding, quantized DCT coefficient vectors of 4×4 size for luminance and 2×2 size for chrominance are zigzag scanned for form (run, level) events.

Referring to FIG. 12, the QuantX 120 includes a prequantizer 121, a vector formatter 122, a transform 123, a quantizer 124 and a scanner 125. The prequantizer 121 receives the signal input to the QuantX 120, and outputs its signal to the vector formatter 122. The vector formatter feeds its output to the transform 123, which in turn feeds the quantizer 124, which feeds the scanner 125. The scanner outputs its signal as the output of the QuantX 120.

The Inverse Operation 130 of the QuantX 120 shown in FIG. 12 is shown in FIG. 13. The input to the inverse QuantX 130 is fed to the inverse scan 131, which feeds the inverse quantizer 132, which in turn feeds the inverse transform 133. The vector unformatter 134 receives the output from the inverse transform 133 and outputs its signal to the inverse prequantizer 135, whose output represents the output of the inverse QuantX 130.

QuantX Method 3: Lattice Vector Quantization of DCT Coefficient Vectors

FIG. 14 illustrates the operations employed by this method of QuantX. The signal input to the QuantX 140 is received by the Vector Formatter 141, which passes its output to the Dimension Reducer 142, which in turn feeds its output to the Vector Quantizer 143. The Vector Quantizer 143 then passes its output to the Vector Quantization Indices Orderer 144, whose output represents the output of the QuantX 140.

In GDT coding of QCIF pictures, using DCT coefficient subpictures of size 22×18, vectors (of 8×8 size for luminance and 4×4 size for chrominance) are generated by collecting all coefficients of the same frequency through all of the subpictures; these vectors are quantized by the LVQ. In LDT coding of region size 32×32, a very similar operation takes place resulting in coefficient vectors (of 4×4 size for luminance and 2×2 size for chrominance); these vectors are also quantized by LVQ. Since VQ often requires small blocks for manageable size codebooks (or in LVQ, a manageable complexity), a reduction of vector dimension may be necessary and is accomplished in Dimension Reducer, which can be as simple an operation as dividing a vector of coefficients into sub-vectors or something more sophisticated. The process of LVQ is not described herein and is discussed in literature. Briefly, however, first LVQ of dimension 16 is tried, if it produces errors higher than a threshold then the LVQ of dimension 4 is tried. Also after LVQ, the LVQ indices of the entire picture or region may be ordered for increased efficiency, this process takes place in VQ Indices Orderer.

The Inverse Operation 150 of the QuantX 140 shown in FIG. 14 is shown in FIG. 15. The input to the inverse QuantX 150 is fed to the Vector Quantization Indices Reorderer 151, which feeds the inverse vector quantizer 152, which in turn feeds the dimension normalizer 153. The vector unformatter 154 receives the output from the dimension normalizer 153 and outputs its signal as the output of the inverse QuantX 150. As in the QuantX 140, in the Inverse QuantX 150, first LVQ of 16 is tried. If it produces errors higher than a threshold, then the LVQ of dimension 4 is tried. The specification of LVQ is the same as that in experiment T.5 in the MPEG 4 trials.

Entropy Coding

We now discuss a VL coding and decoding method for coefficient (run, level) events, which are coded exploiting statistical variations to achieve even further efficiency.

In GDT coding if extended QuantX Method 1 is employed, a maximum run of 396 is possible and a level of at least ±255 needs to be supported. For coding of luminance run/level events, the intra VLC table of U.S. patent application Ser. No. 06/026,963, entitled "Video Coder Providing Implicit Coefficient Prediction and Scan Adaptation for Image Coding and Intra Coding of Video" by Haskell, Puri and Schmidt. U.S. patent application Ser. No. 60/026,963 is hereby incorporated by reference as if recited herein in its entirety. However, since this table supports only a maximum run of 64 and level of ±128 (same as the MPEG-4 VM) it is extended to outside of this region by appending one extra bit for level and three extra bits for run and thus uses up to 25 bits. For coding of chrominance run/level events, the VLC table used is the one in the VM extended to support a maximum run of 396 and level of ±255 by escaping outside of the currently supported region by appending one extra bit for level and three extra bits for run, thus using up to 26 bits. In case of LDT coding, since the subregion size is 8×8, the VLC table of the aforementioned earlier patent application that was incorporated by reference, is employed for luminance and the VLC table of VM is employed for chrominance; both of these tables do not require any extensions.

If extended quantization QuantX Method 2 is employed, in GDT coding, since the vector size is 8×8, the VLC table of the previously incorporated by reference patent application is employed for luminance and the VLC table of VM is employed for chrominance; both of these tables do not require any extensions. In the case of LDT coding, a maximum run for luminance is 15 and that for chrominance is 3; in this case new tables which are subsets of the previously incorporated patent application are employed.

If extended quantization QuantX Method 3 is employed, VLC tables used are based on tables available in MPEG-4 core experiment T5 and are available publicly.

Adaptive Deinterleaved Transform Coding

Further improvements in DT coding are possible by using an encoding structure as shown in FIG. 16, which shows the block diagram of an Adaptive Global Deinterleaved Transform (AGDT) encoder 160. The major difference with respect to FIG. 1 is that a quadtree segmentation is employed by using a Quadtree Segmenter on an entire picture or VOP basis prior to the deinterleaver and is adaptive rather than fixed segmentation. Thus, the deinterleaving is only performed on only the portions identified by Global Quadtree Segmenter to be worth deinterleaving while others are coded without deinterleaving. The operation of other blocks is similar to that discussed for fixed GDT.

Referring to FIG. 16, the image is fed into the Global Quadtree Segmenter 161, whose output is passed to the deinterleaver 162, which in turn passes its output to the transform 163. The QuantX 164 receives the output from the transform 163 and passes is output to the entropy encoder 165, which outputs the coded bitstream.

FIG. 17 shows the block diagram of the AGDT decoder 170 corresponding to the AGDT encoder 160 shown in FIG. 16. The coded bitstream is fed into the entropy decoder 171, the output of which is passed to the inverse QuantX 172, which in turn passes its output to the inverse transform 173. The reinterleaver 174 receives the output from the inverse transform 173 and feeds its output to the Global Quadtree Assembler 175, which outputs the reconstructed image.

FIG. 18 shows a block diagram of an Adaptive Local Deinterleaved Transform (ALDT) encoder 180. The major difference with respect to FIG. 16 is that the quadtree segmentation is applied locally (on regions) rather than the entire picture or VOP. Deinterleaving is then performed on the region identified by the Local Quadtree Segmenter as worth deinterleaving. The remaining blocks are similar to those described above.

The image signal is input to the Local Quadtree Segmenter 181, whose output is fed to the deinterleaver 182, which passes its output to the transform 183. The QuantX 184 receives the output from the transform 183 and passes its output to the entropy encoder 185, which outputs the coded bitstream.

FIG. 19 shows the ALDT decoder 190 that corresponds to the encoder of FIG. 18. The coded bits are fed into the entropy decoder 191, which passes its output to the inverse QuantX 192, which in turn passes its output to the inverse transform 193, which in turn passes its output to the reinterleaver 194. The local quadtree assembler 195 receives the output of the reinterleaver 194 and outputs the reconstructed image.

Quadtree Segmenter

As shown in FIGS. 16 and 18, quadtree segmentation is employed prior to deinterleaving to allow adaptation of the amount of deinterleaving to the spatial content of the picture being coded.

An example of quadtree segmentation employed is shown in FIG. 20; both GDT and LDT use this type of segmentation, the only difference being in the number of levels employed—GDT employs more number of levels of segmentation, whereas LDT employs fewer levels of segmentation.

As shown in FIG. 20, picture block 200 is segmented into subblocks 202–205. Subblock 203 is then further partitioned into sections 206–209. The remaining blocks were not segmented to indicate that this process only segments the necessary blocks.

Syntax and Semantics for MPEG-4

We now provide the necessary syntax and semantics needed for generating coded bitstreams using the present invention. The various classes referred to below correspond to the current syntax of MPEG-4 VM3.2

VideoSession Class

No changes are necessary for this class.

VideoObject Class

No changes are necessary for this class.

VideoObject Layer Class

No changes are necessary for this class.

VideoObject Plane Class

Two new syntax elements are introduced in this class as follows.

:

:

region_size deinterleave_ratio

:

:

These syntax elements are defined as follows.

region_size

This is a 3 bit code which species the size of the region on which deinterleaving is performed prior to coding. The size of the region for each code is shown in Table 1 as follows:

TABLE 1

| Code | Meaning |
|---|---|
| 000 | 16x16 |
| 001 | 32x32 |
| 010 | 64x64 |
| 011 | 128x128 |
| 100 | reserved |
| 101 | reserved |
| 110 | reserved |
| 111 | full picture | deinterleave_ratio

This is the 3-bit code which specifies the amount of deinterleaving performed on the identified region prior to coding. The same deinterleaving ration is used both horizontally and vertically. The amount of deinterleaving for each code is shown in Table 2 as follows.

TABLE 2

| Code | Meaning |
|---|---|
| 000 | 1:1 |
| 001 | 2:1 |
| 010 | 4:1 |
| 011 | 8:1 |
| 100 | 16:1 |
| 101 | reserved |
| 110 | reserved |
| 111 | reserved |

Region Class

Data for each region consists of region header followed by subregion data.

TABLE 3

| Rtype | Rquant | Subregion data |
|---|---|---|

Rquant

Rquant is a 3 bit quantizer that takes nonlinear values bounded by 1 to 31 with the meaning as shown in Table 4.

TABLE 4

| Code | Qp |
|---|---|
| 000 | 2 |
| 001 | 43 |
| 010 | 7 |
| 011 | 10 |
| 100 | 14 |
| 101 | 18 |
| 110 | 23 |
| 111 | 28 |

Subregion Class

The definition of subregion data is dependent on the QuantX method employed and is specified as follows:
For QuantX Method 1:

TABLE 5

| Cod_subreg | Tcoefs_subreg |
|---|---|

Structure of Subregion Class for QuantX Method 1
Cod_subreg
Cod-subreg is a 1 bit flag that identifies if there is any coded data (nonzero values) for that subregion.
Tcoefs_subreg
Tcoefs_subreg are differential quantized coefficients of subregion.
For QuantX Method 2:

TABLE 6

| Cod_vector | Tcoefs_vector |
|---|---|

Structure of Subregion Class for QuantX Method 2
Cod_vector
Cod-vector is a 1 bit flag that identifies if there is any coded data a subregion.
Tcoefs_vector
Tcoefs_vector refers to twice quantized coefficients of a vector.
For QuantX Method 3:

What is claimed is:

1. A method for coding an image comprising the steps of:
   a) deinterleaving the image to form a plurality of image subsets;
   b) transforming the plurality of image subsets into a plurality of transform coefficients;
   c) converting the plurality of transform coefficients to a plurality of samples;
   d) performing an entropy encoding of the plurality of samples to form an encoded bit stream;
   said step c) comprising:
      (i) quantizing the plurality of transform coefficients to form a plurality of quantized values;
      (ii) performing a DC and AC coefficient prediction on the plurality of quantized values to form a plurality of predicted values;
      (iii) determining a difference between the plurality of predicted values and the plurality of quantized values to form a plurality of difference values; and
      (iv) scanning the plurality of difference values to form the plurality of samples.

2. A method for coding an image comprising the steps of:
   a) deinterleaving the image to form a plurality of image subsets;
   b) transforming the plurality of image subsets into a plurality of transform coefficients;
   c) converting the plurality of transform coefficients to a plurality of samples; and
   d) performing an entropy encoding of the plurality of samples to form an encoded bit stream;
   said step a) comprising:
      (i) segmenting the image into a plurality of segments;
      (ii) identifying those segments within the plurality of segments that are worth deinterleaving; and
      (iii) deinterleaving only those segments identified in step a)(ii) as worth deinterleaving.

3. A method for decoding a bit stream representing an image that has been encoded, comprising the steps of:
   a) performing an entropy decoding of the bit stream to form a plurality of samples;
   b) converting the plurality of samples to a plurality of transform coefficients;
   c) performing an inverse transformation on the plurality of transform coefficients to form a plurality of image subsets;
   d) reinterleaving the plurality of image subsets to form the image;

said step b) comprising:
  (i) performing an inverse scanning of the plurality of samples to form a plurality of difference values;
  (ii) adding the plurality of difference values to a plurality of predicted values to form a plurality of quantized values;
  (iii) performing a DC and AC coefficient prediction on the plurality of quantized values to form the plurality of predicted values; and
  (iv) performing an inverse quantization of the plurality of quantized values to form the plurality of transform coefficients.

4. A method for compressing and restoring an image comprising the steps of:
  a) compressing the image including the substeps of:
    (i) deinterleaving the image to form a first plurality of image subsets;
    (ii) transforming the first plurality of image subsets into a first plurality of transform coefficients;
    (iii) converting the first plurality of transform coefficients to a first plurality of samples; and
    (iv) performing an entropy encoding of the first plurality of samples to form an encoded bit stream; and
  b) restoring the image including the substeps of:
    (i) performing an entropy decoding of the encoded bit stream to form a second plurality of samples:
    (ii) converting the second plurality of samples to a second plurality of transform coefficients;
    (iii) performing an inverse transformation on the second plurality of transform coefficients to form a second plurality of image subsets; and
    (iv) reinterleaving the second plurality of image subsets to form the image;
  said step a)(iii) comprising:
    (1) quantizing the first plurality of transform coefficients to form a first plurality of quantized values;
    (2) performing a DC and AC coefficient prediction on the first plurality of quantized values to form a first plurality of predicted values;
    (3) determining a difference between the first plurality of predicted values and the first plurality of quantized values to form a first plurality of difference values; and
    (4) scanning the first plurality of difference values to form the first plurality of samples.

5. The method according to claim 4, wherein the step b) (ii) of converting comprises the steps of:
  (1) performing an inverse scanning of the second plurality of samples to form a second plurality of difference values;
  (2) adding the second plurality of difference values to a second plurality of predicted values to form a second plurality of quantized values;
  (3) performing a DC and AC coefficient prediction on the second plurality of quantized values to form the second plurality of predicted values; and
  (4) performing an inverse quantization of the second plurality of quantized values to form the second plurality of transform coefficients.

6. A method for compressing and restoring an image comprising the steps of:
  a) compressing the image including the substeps of:
    (i) deinterleaving the image to form a first plurality of image subsets;
    (ii) transforming the first plurality of image subsets into a first plurality of transform coefficients;
    (iii) converting the first plurality of transform coefficients to a first plurality of samples; and
    (iv) performing an entropy encoding of the first plurality of samples to form an encoded bit stream; and
  b) restoring the image including the substeps of:
    (i) performing an entropy decoding of the encoded bit stream to form a second plurality of samples:
    (ii) converting the second plurality of samples to a second plurality of transform coefficients;
    (iii) performing an inverse transformation on the second plurality of transform coefficients to form a second plurality of image subsets; and
    (iv) reinterleaving the second plurality of image subsets to form the image;
  said step b) (ii) comprising:
    (1) performing an inverse scanning of the second plurality of samples to form a plurality of difference values;
    (2) adding the plurality of difference values to a plurality of predicted values to form a plurality of quantized values;
    (3) performing a DC and AC coefficient prediction on the plurality of quantized values to form the plurality of predicted values; and
    (4) performing an inverse quantization of the plurality of quantized values to form the second plurality of transform coefficients.

7. A method for compressing and restoring an image comprising the steps of:
  a) compressing the image including the substeps of:
    (i) deinterleaving the image to form a first plurality of image subsets;
    (ii) transforming the first plurality of image subsets into a first plurality of transform coefficients;
    (iii) converting the first plurality of transform coefficients to a first plurality of samples; and
    (iv) performing an entropy encoding of the first plurality of samples to form an encoded bit stream; and
  b) restoring the image including the substeps of:
    (i) performing an entropy decoding of the encoded bit stream to form a second plurality of samples:
    (ii) converting the second plurality of samples to a second plurality of transform coefficients;
    (iii) performing an inverse transformation on the second plurality of transform coefficients to form a second plurality of image subsets; and
    (iv) reinterleaving the second plurality of image subsets to form the image;
  said step a) (i) comprising:
    (1) segmenting the image into a first plurality of segments prior to deinterleaving; and
    (2) identifying those segments within the first plurality of segments that are worth deinterleaving; and
    (3) deinterleaving only those segments identified in step a) (ii) as worth deinterleaving.

8. The method according to claim 7, wherein the step b (iv) of reinterleaving further comprises the steps of:
  (1) reinterleaving the second plurality of image subsets to form a second plurality of segments; and
  (2) assembling the second plurality of segments formed by the reinterleaving step d) (i) into the image.

9. A method for coding an image comprising the steps of:
  a) segmenting the image into a plurality of local regions;
  b) deinterleaving the plurality of local regions to form a plurality of deinterleaved regions;

c) transforming the plurality of deinterleaved regions into a plurality of transform coefficients;
d) converting the plurality of transform coefficients to a plurality of samples; and
e) performing an entropy encoding of the plurality of samples to form an encoded bit stream;
said step d) comprising:
 (i) quantizing the plurality of transform coefficients to form a plurality of quantized values;
 (ii) performing a DC and AC coefficient prediction on the plurality of quantized values to form a plurality of predicted values;
 (iii) determining a difference between the plurality of predicted values and the plurality of quantized values to form a plurality of difference values; and
 (iv) scanning the plurality of difference values to form the plurality of samples.

10. A method for coding an image comprising the steps of:
a) segmenting the image into a plurality of local regions;
b) deinterleaving the plurality of local regions to form a plurality of deinterleaved regions;
c) transforming the plurality of deinterleaved regions into a plurality of transform coefficients;
d) converting the plurality of transform coefficients to a plurality of samples; and
e) performing an entropy encoding of the plurality of samples to form an encoded bit stream;
said step b) comprising:
 (i) segmenting further the local regions created by the step a) of segmenting into a plurality of local region segments;
 (ii) identifying those segments within the plurality of local region segments that are worth deinterleaving; and
 (iii) deinterleaving only those segments identified in said step b)(ii) as worth deinterleaving.

11. A method for decoding a bit stream representing an image that has been encoded, comprising the steps of:
a) performing an entropy decoding of the bit stream to form a plurality of samples;
b) converting the plurality of samples to a plurality of transform coefficients;
c) performing an inverse transformation of the plurality of transform coefficients to form a plurality of deinterleaved regions;
d) reinterleaving the plurality of deinterleaved regions to form a plurality of local regions; and
e) assembling the plurality of local regions to form the image;
said step b) comprising:
 (i) performing an inverse scanning of the plurality of samples to form a plurality of quantized values;
 (ii) adding the plurality of difference values to a plurality of predicted values to form a plurality of quantized values;
 (iii) performing a DC and AC coefficient prediction on the plurality of quantized values to form the plurality of predicted values; and
 (iv) performing an inverse quantization of the plurality of quantized values to form a plurality of transformed vectors using a first quantization level.

12. A method for compressing and restoring an image comprising the steps of:
a) compressing the image including the substeps of:
 (i) segmenting the image into a first plurality of local regions;
 (ii) deinterleaving each local region of the first plurality of local regions to form a first plurality of deinterleaved regions;
 (iii) transforming the first plurality of deinterleaved regions into a first plurality of transform coefficients;
 (iv) converting the first plurality of transform coefficients to a first plurality of samples and
 (v) performing an entropy encoding of the first plurality of samples to form an encoded bit stream; and
b) restoring the image including the substeps of:
 (i) performing an entropy decoding of the bit stream to form a second plurality of samples;
 (ii) converting the second plurality of samples to a second plurality of transform coefficients;
 (iii) performing an inverse transformation of the second plurality of transform coefficients to form a second plurality of deinterleaved regions;
 (iv) reinterleaving each region of the second plurality of deinterleaved regions to form a second plurality of local regions; and
 (v) assembling the second plurality of local regions to form the image;
said step a(iv) comprising:
  (1) quantizing the first plurality of transform coefficients to form a first plurality of quantized values;
  (2) performing a DC and AC coefficient prediction on the first plurality of quantized values to form a first plurality of predicted values;
  (3) determining a difference between the first plurality of predicted values and the first plurality of quantized values to form a first plurality of difference values; and
  (4) scanning the first plurality of difference values to form the first plurality of samples.

13. A method for compressing and restoring an image comprising the steps of:
a) compressing the image including the substeps of:
 (i) segmenting the image into a first plurality of local regions;
 (ii) deinterleaving each local region of the first plurality of local regions to form a first plurality of deinterleaved regions;
 (iii) transforming the first plurality of deinterleaved regions into a first plurality of transform coefficients;
 (iv) converting the first plurality of transform coefficients to a first plurality of samples and
 (v) performing an entropy encoding of the first plurality of samples to form an encoded bit stream; and
b) restoring the image including the substeps of:
 (i) performing an entropy decoding of the bit stream to form a second plurality of samples;
 (ii) converting the second plurality of samples to a second plurality of transform coefficients;
 (iii) performing an inverse transformation of the second plurality of transform coefficients to form a second plurality of deinterleaved regions;
 (iv) reinterleaving each region of the second plurality of deinterleaved regions to form a second plurality of local regions; and
 (v) assembling the second plurality of local regions to form the image;
said step b) (ii) comprisisng:
  (1) performing an inverse scanning of the second plurality of samples to form a plurality of difference values;
  (2) adding the plurality of difference values to a plurality of predicted values to form a plurality of quantized values;

(3) performing a DC and AC coefficient prediction on the plurality of quantized values to form the plurality of predicted values; and (4) performing an inverse quantization of the plurality of quantized values to form the second plurality of transform coefficients.

14. A method for compressing and restoring an image comprising the steps of:

a) compressing the image including the substeps of:
(i) segmenting the image into a first plurality of local regions;
(ii) deinterleaving each local region of the first plurality of local regions to form a first plurality of deinterleaved regions;
(iii) transforming the first plurality of deinterleaved regions into a first plurality of transform coefficients;
(iv) converting the first plurality of transform coefficients to a first plurality of samples and
(v) performing an entropy encoding of the first plurality of samples to form an encoded bit stream; and b) restoring the image including the substeps of:
(i) performing an entropy decoding of the bit stream to form a second plurality of samples;
(ii) converting the second plurality of samples to a second plurality of transform coefficients;
(iii) performing an inverse transformation of the second plurality of transform coefficients to form a second plurality of deinterleaved regions;
(iv) reinterleaving each region of the second plurality of deinterleaved regions to form a second plurality of local regions; and
(v) assembling the second plurality of local regions to form the image;
said step a)(ii) comprising:
(1) segmenting further each of the first plurality of local regions into a first plurality of local region segments;
(2) identifying those segments within the first plurality of local region segments that are worth deinterleaving; and
(3) deinterleaving only those segments identified in said step a(ii)(2) as worth deinterleaving.

15. The method according to claim 14, wherein the step b)(iv) of reinterleaving further comprises the steps of:
(1) reinterleaving each of the second plurality of deinterleaved regions to form a second plurality of local region segments; and
(2) assembling the second plurality of local region segments to form the second plurality of local regions.

16. An apparatus for coding an image comprising:
a) a deinterleaver receiving the image and deinterleaving the image to form a plurality of image subsets:
b) a transformer being coupled to the deinterleaver and transforming the plurality of image subsets into a plurality of transform coefficients;
c) a converter being coupled to the transformer and converting the plurality of transform coefficients to a plurality of samples; and
d) an encoder being coupled to the converter and performing an entropy encoding of the plurality of samples to form an encoded bit stream;
said converter comprising an extended quantizer which includes:
e) a quantizer being coupled to the transformer and quantizing the plurality of transform coefficients to form a plurality of quantized values;
f) a coefficient predictor being coupled to the quantizer and performing a DC and AC coefficient prediction on the plurality of quantized values to form a plurality of predicted values;
g) a comparator being coupled to the quantizer and the coefficient predictor and determining a difference between the plurality of predicted values and the plurality of quantized values to form a plurality of differenced values; and
h) a scanner being coupled to the comparator and scanning the plurality of difference values to form the plurality of samples.

17. An apparatus for coding an image comprising:
a) a deinterleaver receiving the image and deinterleaving the image to form a plurality of image subsets:
b) a transformer being coupled to the deinterleaver and transforming the plurality of image subsets into a plurality of transform coefficients;
c) a converter being coupled to the transformer and converting the plurality of transform coefficients to a plurality of samples;
d) an encoder being coupled to the converter and performing an entropy encoding of the plurality of samples to form an encoded bit stream;
said converter comprising an extended quantizer which includes:
e) a global quadtree segmenter receiving the image, having an output coupled to the deinterleaver, segmenting the image into a plurality of segments, and identifying those segments within the plurality of segments that are worth deinterleaving, wherein the deinterleaver deinterleaves only those segments identified by the global quadtree segmenter as worth deinterleaving.

18. An apparatus for decoding a bit stream representing an image that has been encoded, comprising:
a) a decoder receiving the bit stream and performing an entropy decoding of the bit stream to form a plurality of samples;
b) a converter being coupled to the decoder and converting the plurality of samples to a plurality of transform coefficients;
c) a reverse transformer being coupled to the converter and performing an inverse transformation of the plurality of transform coefficients to form a plurality of image subsets; and
d) a reinterleaver being coupled to the reverse transformer and reinterleaving the plurality of image subsets to form the image; said converter comprising an inverse extended quantizer which includes:
e) an inverse scanner being coupled to the decoder and performing an inverse scan on the plurality of samples to form a plurality of difference values:
f) an adder having a first input being coupled to the inverse scanner, having a second input, and having an output outputting a plurality of quantized values;
g) a coefficient predictor having an input being coupled to the output of the adder, performing a DC and AC coefficient prediction on the plurality of quantized values to form a plurality of predicted values, and having an output being coupled to the second input of the adder, wherein the plurality of quantized values equals a sum of the plurality of difference values and the plurality of predicted values; and
h) an inverse quantizer being coupled to the adder and inverse quantizing the plurality of quantized values to form the plurality of transform coefficients.

19. A device for compressing and restoring an image comprising:
  a) a deinterleaver receiving the image and deinterleaving the image to form a first plurality of image subsets;
  b) a transformer being coupled to the deinterleaver and transforming the first plurality of image subsets into a first plurality of transform coefficients;
  c) a first converter being coupled to the transformer and converting the first plurality of transform coefficients to a first plurality of samples:
  d) an encoder being coupled to the converter and performing an entropy encoding of the first plurality of samples to form an encoded bit stream;
  e) a decoder receiving the encoded bit stream and performing an entropy decoding of the encoded bit stream to form a second plurality of samples:
  f) a second converter being coupled to the decoder and converting the second plurality of samples to a second plurality of transform coefficients:
  g) a reverse transformer being coupled to the second converter and performing an inverse transformation of the second plurality of transform coefficients to form a second plurality of image subsets; and
  h) a reinterleaver being coupled to the reverse transformer and reinterleaving the second plurality of image subsets to form the image;
    said first converter comprising an extended quantizer which includes:
      i) a quantizer being coupled to the transformer and quantizing the first plurality of transform coefficients to form a first plurality of quantized values;
      j) a coefficient predictor being coupled to the quantizer and performing a DC and AC coefficient prediction on the first plurality of quantized values to form a first plurality of predicted values;
      k) a comparator being coupled to the quantizer and the coefficient predictor and determining a difference between the first plurality of predicted values and the first plurality of quantized values to form a first plurality of difference values; and
      l) a scanner being coupled to the comparator and scanning the first plurality of difference values to form the first plurality of samples.

20. The device according to claim 19, wherein the second converter comprises an inverse extended quantizer, said inverse extended quantizer including:
  a) an inverse scanner being coupled to the decoder and performing an inverse scan on the second plurality of samples to form a second plurality of difference values;
  b) an adder having a first input being coupled to the inverse scanner, having a second input, and having an output outputting a second plurality of quantized values;
  c) a coefficient predictor having an input being coupled to the output of the adder, performing a DC and AC coefficient prediction on the second plurality of quantized values to form a second plurality of predicted values, and having an output being coupled to the second input of the adder, wherein the second plurality of quantized values equals a sum of the second plurality of difference values and the second plurality of predicted values; and
  d) an inverse quantizer being coupled to the adder and inverse quantizing the second plurality of quantized values to form the second plurality of transform coefficients.

21. A device for compressing and restoring an image comprising:
  a) a deinterleaver receiving the image and deinterleaving the image to form a first plurality of image subsets;
  b) a transformer being coupled to the deinterleaver and transforming the first plurality of image subsets into a first plurality of transform coefficients;
  c) a first converter being coupled to the transformer and converting the first plurality of transform coefficients to a first plurality of samples:
  d) an encoder being coupled to the converter and performing an entropy encoding of the first plurality of samples to form an encoded bit stream;
  e) a decoder receiving the encoded bit stream and performing an entropy decoding of the encoded bit stream to form a second plurality of samples:
  f) a second converter being coupled to the decoder and converting the second plurality of samples to a second plurality of transform coefficients:
  g) a reverse transformer being coupled to the second converter and performing an inverse transformation of the second plurality of transform coefficients to form a second plurality of image subsets; and
  h) a reinterleaver being coupled to the reverse transformer and reinterleaving the second plurality of image subsets to form the image;
    said second converter comprising an inverse extended quantizer which includes:
      i) an inverse scanner being coupled to the decoder and performing an inverse scan on the second plurality of samples to form a plurality of difference values;
      j) an adder having a first input being coupled to the inverse scanner, having a second input, and having an output outputting a plurality of quantized values;
      k) a coefficient predictor having an input being coupled to the output of the adder, performing a DC and AC coefficient prediction on the plurality of quantized values to form a plurality of predicted values, and having an output being coupled to the second input of the adder, wherein the plurality of quantized values equals a sum of the plurality of difference values and the plurality of predicted values; and
      l) an inverse quantizer being coupled to the adder and inverse quantizing the plurality of quantized values to form the second plurality of transform coefficients.

22. A device for compressing and restoring an image comprising:
  a) a deinterleaver receiving the image and deinterleaving the image to form a first plurality of image subsets;
  b) a transformer being coupled to the deinterleaver and transforming the first plurality of image subsets into a first plurality of transform coefficients;
  c) a first converter being coupled to the transformer and converting the first plurality of transform coefficients to a first plurality of samples:
  d) an encoder being coupled to the converter and performing an entropy encoding of the first plurality of samples to form an encoded bit stream;
  e) a decoder receiving the encoded bit stream and performing an entropy decoding of the encoded bit stream to form a second plurality of samples:

f) a second converter being coupled to the decoder and converting the second plurality of samples to a second plurality of transform coefficients:

g) a reverse transformer being coupled to the second converter and performing an inverse transformation of the second plurality of transform coefficients to form a second plurality of image subsets;

h) a reinterleaver being coupled to the reverse transformer and reinterleaving the second plurality of image subsets to form the image; and i) a global quadtree segmenter receiving the image, having an output coupled to the deinterleaver, segmenting the image into a plurality of segments, and identifying those segments within the plurality of segments that are worth deinterleaving, wherein the deinterleaver deinterleaves only those segments identified by the global quadtree segmenter as worth deinterleaving.

23. A device for compressing and restoring an image comprising:

a) a deinterleaver receiving the image and deinterleaving the image to form a first plurality of image subsets;

b) a transformer being coupled to the deinterleaver and transforming the first plurality of image subsets into a first plurality of transform coefficients;

c) a first converter being coupled to the transformer and converting the first plurality of transform coefficients to a first plurality of samples:

d) an encoder being coupled to the converter and performing an entropy encoding of the first plurality of samples to form an encoded bit stream;

e) a decoder receiving the encoded bit stream and performing an entropy decoding of the encoded bit stream to form a second plurality of samples:

f) a second converter being coupled to the decoder and converting the second plurality of samples to a second plurality of transform coefficients:

g) a reverse transformer being coupled to the second converter and performing an inverse transformation of the second plurality of transform coefficients to form a second plurality of image subsets; and h) a reinterleaver being coupled to the reverse transformer and reinterleaving the second plurality of image subsets to form the image; and i) a global quadtree assembler being coupled to the reinterleaver, wherein the reinterleaver reinterleaves the plurality of image subsets to form a plurality of segments, and the global quadtree assembler assembles the plurality of segments formed by the reinterleaver into the image.

24. A system for coding an image comprising:

a) a segmenter receiving the image and segmenting the image into a plurality of local regions;

b) a deinterleaver being coupled to the segmenter and deinterleaving the plurality of local regions to form a plurality of local region subsets;

c) a transformer being coupled to the interleaver and transforming the pluralilty of local region subsets into a plurality of transform coefficients;

d) a converter being coupled to the transformer and converting the plurality of transform coefficients to a plurality of samples; and e) an encoder being coupled to the converter and performing an entropy encoding of the plurality of samples to form an encoded bit stream;

said converter further comprising an extended quantizer which includes:

f) a quantizer being coupled to the transformer and quantizing the plurality of transform coefficients to form a plurality of quantized values;

g) a coefficient predictor being coupled to the quantizer and performing a DC and AC coefficient prediction on the plurality of quantized values to form a plurality of predicted values;

h) a comparator being coupled to the quantizer and the coefficient predictor and determining a difference between the plurality of predicted values and the plurality of quantized values to form a plurality of difference values; and i) a scanner being coupled to the comparator and scanning the plurality of difference values to form the plurality of samples.

25. A system for coding an image comprising:

a) a segmenter receiving the image and segmenting the image into a plurality of local regions;

b) a deiniterleaver being coupled to the segmenter and deinterleaving the plurality of local regions to form a plurality of local region subsets;

c) a transformer being coupled to the interleaver and transforming the pluralilty of local region subsets into a plurality of transform coefficients;

d) a converter being coupled to the transformer and converting the plurality of transform coefficients to a plurality of samples;

e) an encoder being coupled to the converter and performing an entropy encoding of the plurality of samples to form an encoded bit stream; and f) a local quadtree segmenter being coupled to the segmenter, having an output coupled to the deinterleaver, segmenting the plurality of local regions into a plurality of local region segments, and identifying those local region segments within the plurality of local region segments that are worth deinterleaving, wherein the deinterleaver deinterleaves only those local region segments identified by the local quadtree segmenter as worth deinterleaving.

26. A system for decoding a bit stream representing an image that has been encoded, comprising:

a) a decoder receiving the bit stream and performing an entropy decoding of the bit stream to form a plurality of samples;

b) a converter being coupled to the decoder and converting the plurality of samples to a plurality of transform coefficients;

c) a reverse transformer being coupled to the converter and performing an inverse transformation of the plurality of transform coefficients to form a plurality of local region subsets;

d) a reinterleaver being coupled to the reverse transformer and reinterleaving the plurality of local region subsets to form a plurality of local regions: and e) an assembler being coupled to the reinterleaver and assembling the plurality of local regions to form the image;

said converter comprising an inverse extended quantizer which includes:

f) an inverse scanner being coupled to the decoder and performing an inverse scan on the plurality of samples to form a plurality of difference values;

g) an adder having a first input being coupled to the inverse scanner, having a second input, and having an output outputting a plurality of quantized values;

h) a coefficient predictor having an input being coupled to the output of the adder, performing a DC and AC coefficient prediction on the plurality of quantized values to form a plurality of predicted values, and having an output being coupled to the second input of the adder, wherein the plurality of quantized values equals a sum of the plurality of difference values and the plurality of predicted values; and i) an inverse quantizer being coupled to the adder and inverse quantizing the plurality of quantized values to form the plurality of transform coefficients.

27. A system for compressing and restoring an image comprising:

a) a segmenter receiving the image and segmenting the image into a first plurality of local regions;

b) a deinterleaver being coupled to the segmenter and deinterleaving the first plurality of local regions to form a first plurality of local region subsets;

c) a transformer being coupled to the deinterleaver and transforming the first plurality of local region subsets into a first plurality of transform coefficients;

d) a first converter being coupled to the transformer and converting the first plurality of transform coefficients to a first plurality of samples;

e) an encoder being coupled to the converter and performing an entropy encoding of the first plurality of samples to form an encoded bit stream;

f) a decoder receiving the encoded bit stream and performing an entropy decoding of the encoded bit stream to form a second plurality of samples;

g) a second converter being coupled to the decoder and converting the second plurality of samples to a second plurality of transform coefficients;

h) a reverse transformer being coupled to the second converter and performing an inverse transformation of the second plurality of transform coefficients to form a second plurality of local region subsets;

i) a reinterleaver being coupled to the reverse transformer and reinterleaving the second plurality of local region subsets to form a second plurality of local regions;

j) an assembler being coupled to the reinterleaver and assembling the second plurality of local regions to form the image;

said first converter comprising an extended quantizer which includes:

k) a quantizer being coupled to the transformer and quantizing the first plurality of transform coefficients to form a first plurality of quantized values;

l) a coefficient predictor being coupled to the quantizer and performing a DC and AC coefficient prediction on the first plurality of quantized values to form a first plurality of predicted values;

m) a comparator being coupled to the quantizer and the coefficient predictor and determining a difference between the first plurality of predicted values and the first plurality of quantized values to form a first plurality of difference values; and n) a scanner being coupled to the comparator and scanning the first plurality of difference values to form the first plurality of samples.

28. The system according to claim 27, wherein the second converter comprises an inverse extended quantizer, said inverse extended quantizer including:

a) an inverse scanner being coupled to the decoder and performing an inverse scan on the second plurality of samples to form a second plurality of difference values;

b) an adder having a first input being coupled to the inverse scanner, having a second input, and having an output outputting a second plurality of quantized values;

c) a coefficient predictor having an input being coupled to the output of the adder, performing a DC and AC coefficient prediction on the second plurality of quantized values to form a second plurality of predicted values, and having an output being coupled to the second input of the adder, wherein the second plurality of quantized values equals a sum of the second plurality of difference values and the second plurality of predicted values; and d) an inverse quantizer being coupled to the adder and inverse quantizing the second plurality of quantized values to form the second plurality of transform coefficients.

29. A system for compressing and restoring an image comprising:

a) a segmenter receiving the image and segmenting the image into a first plurality of local regions;

b) a deinterleaver being coupled to the segmenter and deinterleaving the first plurality of local regions to form a first plurality of local region subsets;

c) a transformer being coupled to the deinterleaver and transforming the first plurality of local region subsets into a first plurality of transform coefficients;

d) a first converter being coupled to the transformer and converting the first plurality of transform coefficients to a first plurality of samples;

e) an encoder being coupled to the converter and performing an entropy encoding of the first plurality of samples to form an encoded bit stream;

f) a decoder receiving the encoded bit stream and performing an entropy decoding of the encoded bit stream to form a second plurality of samples;

g) a second converter being coupled to the decoder and converting the second plurality of samples to a second plurality of transform coefficients;

h) a reverse transformer being coupled to the second converter and performing an inverse transformation of the second plurality of transform coefficients to form a second plurality of local region subsets;

i) a reinterleaver being coupled to the reverse transformer and reinterleaving the second plurality of local region subsets to form a second plurality of local regions;

j) an assembler being coupled to the reinterleaver and assembling the second plurality of local regions to form the image;

said second converter comprises and inverse extended quantizer, which includes:

k) an inverse scanner being coupled to the decoder and performing an inverse scan on the second plurality of samples to form a plurality of difference values;

l) an adder having a first input being coupled to the inverse scanner, having a second input, and having an output outputting a plurality of quantized values;

m) a coefficient predictor having an input being coupled to the output of the adder, performing a DC and AC coefficient prediction on the plurality of quantized values to form a plurality of predicted values, and having an output being coupled to the second input of the adder, wherein the plurality of quantized values equals a sum of the plurality of difference values and the plurality of predicted values; and n) an inverse quantizer being coupled to the adder and inverse quantizing the plurality of quantized values to form the second plurality of transform coefficients.

30. A system for compressing and restoring an image comprising:

a) a segmenter receiving the image and segmenting the image into a first plurality of local regions;

b) a deinterleaver being coupled to the segmenter and deinterleaving the first plurality of local regions to form a first plurality of local region subsets;

c) a transformer being coupled to the deinterleaver and transforming the first plurality of local region subsets into a first plurality of transform coefficients;

d) a first converter being coupled to the transformer and converting the first plurality of transform coefficients to a first plurality of samples;

e) an encoder being coupled to the converter and performing an entropy encoding of the first plurality of samples to form an encoded bit stream;

f) a decoder receiving the encoded bit stream and performing an entropy decoding of the encoded bit stream to form a second plurality of samples;

g) a second converter being coupled to the decoder and converting the second plurality of samples to a second plurality of transform coefficients;

h) a reverse transformer being coupled to the second converter and performing an inverse transformation of the second plurality of transform coefficients to form a second plurality of local region subsets;

i) a reinterleaver being coupled to the reverse transformer and reinterleaving the second plurality of local region subsets to form a second plurality of local regions;

j) an assembler being coupled to the reinterleaver and assembling the second plurality of local regions to form the image; and k) a local quadtree segmenter being coupled to the segmenter, having an output coupled to the deinterleaver, segmenting the first plurality of local regions into a first plurality of local region segments, and identifying those local region segments within the first plurality of local region segments that are worth deinterleaving, wherein the deinterleaver deinterleaves only those local region segments identified by the local quadtree segmenter as worth deinterleaving.

31. The system according to claim 30, further comprising:

a) a local quadtree assembler having an input being coupled to the reinterleaver, and having an output being coupled to the assembler, wherein the reinterleaver reinterleaves the second plurality of deinterleaved regions to form a second plurality of local region segments to form the second plurality of local regions and outputs the second plurality of local regions to the assembler.

* * * * *